United States Patent [19]

Proctor et al.

[11] Patent Number: 5,943,376
[45] Date of Patent: Aug. 24, 1999

[54] METHOD AND SYSTEM FOR TIME ALIGNING A FRAME IN A COMMUNICATION SYSTEM

[75] Inventors: Lee Michael Proctor, Cary; Quoc Vinh Nguyen, Lake Zurich; Gino Anthony Scribano, Elk Grove Village; Gregory Keith Wheeler, Elmhurst, all of Ill.

[73] Assignee: Motorola, Inc., Schaumburg, Ill.

[21] Appl. No.: 08/417,566

[22] Filed: Apr. 6, 1995

[51] Int. Cl.[6] .................................................. H04L 7/00
[52] U.S. Cl. .......................... 375/358; 375/364; 375/368; 370/506
[58] Field of Search ..................................... 375/364, 365, 375/368, 369, 370, 357, 358; 370/503, 506, 512, 514

[56] References Cited

U.S. PATENT DOCUMENTS

| | | |
|---|---|---|
| 4,204,093 | 5/1980 | Yeh . |
| 4,252,999 | 2/1981 | Acampora et al. ..................... 370/323 |
| 4,332,026 | 5/1982 | Alvarez, III et al. . |
| 4,748,623 | 5/1988 | Fujimoto . |
| 4,759,016 | 7/1988 | Otsuka . |
| 4,817,089 | 3/1989 | Paneth et al. . |
| 4,930,126 | 5/1990 | Kazecki et al. . |
| 5,003,535 | 3/1991 | May, Jr. et al. ......................... 370/514 |
| 5,027,381 | 6/1991 | Theobald . |
| 5,111,454 | 5/1992 | Hung et al. . |
| 5,303,270 | 4/1994 | Fujii . |

OTHER PUBLICATIONS

Tom Kilm and Duncan Sparrel, AT&T Bell Laboratories, Proposed Variable Rate ADPCM Algorithm and Line Format, Feb. 4, 1985.

AT&T, Technical Reference, M44 Multiplexing A Service Function of ACCUNET® T1.5.

Motorola General Systems Sector, Gino Scribano, CDMA STRAU Interface Control Document, Version 2.3, Aug. 25, 1994.

European Telecommunications Standards Institute, Inband Control of Remote Transcoders and Rate Adaptors, Dec. 1992 GSM Recommendation 08.60, Version 4.0.0, 27 pages.

European Telecommunications Standards Institute, Base Station Controller (BSC) to Base Transceiver Station (BTS) Interface, Jun. 26, 1992, GSM 08.51, version 4.0.0, 4 pages.

European Telecommunications Standards Institute, Base Station Controller (BSC) to Base Transceiver Station (BTS) Interface, Jun. 26, 1992, GSM 08.52, Version 4.0.0, 15 pages.

*Primary Examiner*—Don N. Vo
*Attorney, Agent, or Firm*—John B. MacIntyre; Richard A. Sonnentag

[57] ABSTRACT

A method and system for time aligning a frame (60) in a communication network (10) involves the steps of; i) determining if a frame needs to be advanced at a BTS (14), and ii) sending a shortened synchronization pattern from the BSC (12). The BTS (14) then determines if a short or long synchronization pattern has been sent by determining (256) if the received data stream matches a long synchronization pattern and setting a first flag when they do match. If the received data stream does not match the long synchronization pattern and the first flag is set (264), the data stream is compared (266) to the short synchronization pattern. When they match a second flag is set (268).

4 Claims, 6 Drawing Sheets

FIG.1 —PRIOR ART—

CONTROL BITS

| | |
|---|---|
| 1 | DIRECTION BIT |
| 3 | FRAME TYPE |
| 2 | FRAME SEQUENCE |
| 9 | BAD FRAME QUALITY INDICATOR |
| 5 | DATA RATE TYPE |
| 1 | TIMING ALIGNMENT ALARM |
| 5 | HAMMING CODE |
| 8 | TIMING ALIGNMENT PARAMETER |
| 3 | FRAME ALIGNMENT PARAMETER |

CONTROL BITS

| | |
|---|---|
| 1 | DIRECTION BIT |
| 3 | FRAME TYPE |
| 2 | FRAME SEQUENCE |
| 9 | BAD FRAME QUALIY |
| 5 | DATA RATE TYPE |
| 1 | SHARED TIME/FRAME ALIGNMENT |

5,943,376

METHOD AND SYSTEM FOR TIME ALIGNING A FRAME IN A COMMUNICATION SYSTEM

FIELD OF THE INVENTION

The present application relates generally to the field of communication systems and more specifically to a method and system for time aligning a frame in a communication system.

BACKGROUND OF THE INVENTION

The Code Division Multiple Access (CDMA) standard (IS-95) for cellular communication systems calls for an 8 Kbps voice coding (vocoding) algorithm. A vocoder converts speech into a digital data stream. A number of techniques have been used to reduce the data rate necessary to send acceptable speech signals. Despite this any given voice coding system produces a higher quality speech signal when it has a higher data rate.

Field tests of the 8 Kbps vocoder for the CDMA cellular systems have shown non-optimal speech quality. The obvious solution is to increase the data rate of the vocoder. This solution can have major impacts on other parts of the CDMA cellular telephone system.

Part of a CDMA cellular system 10 is shown in FIG. 1. A base station controller (BSC) 12 is coupled to a number of base transceiver sites 14 (BTS) through T1 telephone lines 16. The BTS 14 is in radio communication with a plurality of mobiles (portables or subscriber units) 18. In the CDMA system 10 incoming voice data is received by the BSC 12 from the public switched telephone network (PSTN) 20. A single voice channel consists of a 64 Kbps, pulse code modulation (PCM) signal. The BTS 14 transmits a single voice channel at 16 Kbps, including overhead data. The BSC 12 has a plurality of transcoders (XCDR) 22 that compress the 64 Kbps voice channels from the PSTN into 16 Kbps voice and control channels. Since the BSC 12 has more than a single channel of voice coming in from the PSTN 20 a demultiplexer 24 is necessary to separate the channels. Once the channels have been transcoded, they are multiplexed, by multiplexer 26 onto the T1 line 16. A controller 28 controls all aspects of the BSC 12.

The BTS 14 receives the plurality of voice signals from the T1 line 16 and demultiplexer 30 separates the voice channels and directs them to one of a plurality of transceivers (XCVR) 32. The transceivers 32 modulate the received voice signals for radio transmission over an antenna 34. A combiner/separator 36 couples the plurality of transceivers 32 to the antenna 34. The BTS 14 has a global positioning system (GPS) receiver 38, the function of which will be explained more fully below. A controller 40 coordinates and controls all aspects of the BTS 14.

The received voice signals from the PSTN 20 do not contain any of the control information necessary for the BSC 12 to communicate with the BTS 14. This control information is added by the BSC 12. The control information and transcoded voice data are transmitted in a frame. An example of a prior art frame 50 is shown in FIG. 2. The prior art frame 50 contains 320 bits and is 20 ms long. The frame 50 has a 35 bit synchronization word, 37 bits of control data, 202 bits of data (voice), 42 bits for a Universal Time Counter (UTC) and 4 T bits. In the prior art 8 Kbps vocoder only 166 of the 202 bits were used for the voice signal. Any vocoder changes to the CDMA standard need to fit within a 16 Kbps frame unless a major redesign of other parts of the architecture is undertaken. To meet the desired voice quality standards a 13.25 Kbps vocoder was chosen. This requires 265 data bits per frame.

A new frame structure was devised to achieve the 13.25 Kbps vocoding scheme. First, all the available data bits are used, increasing the available data bits to 202. The UTC bits are only sent on non-full rate links, freeing up 42 bits. The Hamming code portion of the control data bits are eliminated as unnecessary, freeing up 5 bits. The bad frame quality indicator is reduced to 9 bits. However, the frame sequence bits have to be increase by 1 bit. All these changes allow 253 bit per frame, twelve bits short of the necessary 265 bits.

The 4 T bits were rarely used, and there only function is to reserve time in case a frame needs to be advance in time. Further the frame and time alignment bits were not needed every frame, but were expected by the BTS 14 and BSC 12. Thus there exists a need for a frame and time alignment system and method that uses fewer bit per frame to free up bits for data.

DETAILED DESCRIPTION OF THE DRAWINGS

Figure 1:
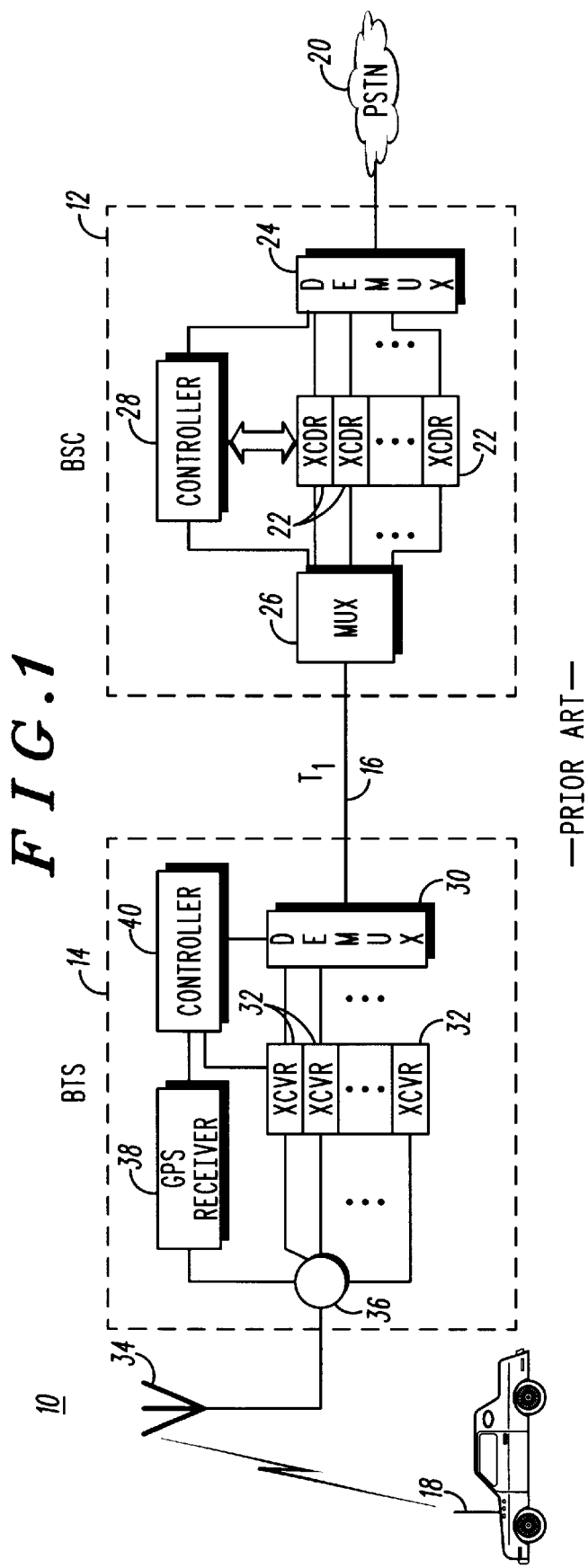
FIG. 1 is a block diagram of part of a code division multiple access (CDMA) cellular telephone system.
Figure 2:
FIG. 2 is a schematic representation of a prior art frame structure.

The present invention provides an improved frame and time alignment system and process for a communication system. The frame and time alignment system reduce the overhead or control bits, freeing up bits for voice or data and thereby allowing better voice quality or higher data rates.

In digital cellular communication systems it is important that the frames or slots from various base sites be time coordinated (i.e., transmitted at predetermined intervals). Failure to do so can result in interference between base sites and disrupt handoff procedures. Direct Sequence Code Division Multiple Access (DS-CDMA) systems achieve time coordination by using GPS receivers 38 at the BTSs 14 to provide a universal clock. Using the universal clock the BTS 14 informs the BSC 12 of the frame sequence number to be transmitted by sending a frame alignment parameter. The frame sequence number ranges from 0 to 7 and the BSC 12 inserts the frame sequence number into the control bits of the frame 50.

Once the frame sequence number has been adjusted the frame time is aligned. The incoming voice data from the PSTN 20 arrives at the BSC 12 asynchronously. The asynchronous data from the PSTN 20 is transcoded and formed into frames by the transcoder 22 and transmitted to the BTS 14. Any delay the BTS 14 introduces before transmitting the frame results in speech delay, so it transmits the frame 50 after it is modulated for radio transmission. The BTS 14 measures when the frame should have been transmitted versus when the frame was transmitted, and sends a time alignment parameter to the BSC 12 to advance or retard the transmission of the frame 50 from the BSC 12. In the prior art, T bits were inserted into the frame 50 to allow for advancement of the frame 50. When the frame 50 needs to be advanced, the frame is sent without the T bits, which advances the next frame by four bits or 250 μsec. A frame 50 may be delayed by inserting a time gap before the transmission of the next frame 50. In the prior art frame 50 structure, the time alignment parameter used 8 bits, the frame alignment parameter used 3 bits and 4 T bits were used for advancing a frame.

Figure 3:
FIG. 3 is a schematic representation of a new frame structure.

The new frame 60 structure (see FIG. 3) eliminates the T bits and uses only 3 bits for the time and frame alignment parameter. This frame 60 structure provides 265 bits for data, thereby achieving the 13.25 Kbps vocoder rate. To make the new frame 60 work requires redesigning the frame and time alignment procedures and the synchronization procedure. Essentially the frame and time alignment parameters are time division multiplexed over several frames. The T bits are replaced with a variable length synchronization word and the synchronization detection system is redesigned to track the variable length synchronization word.

Figure 4:
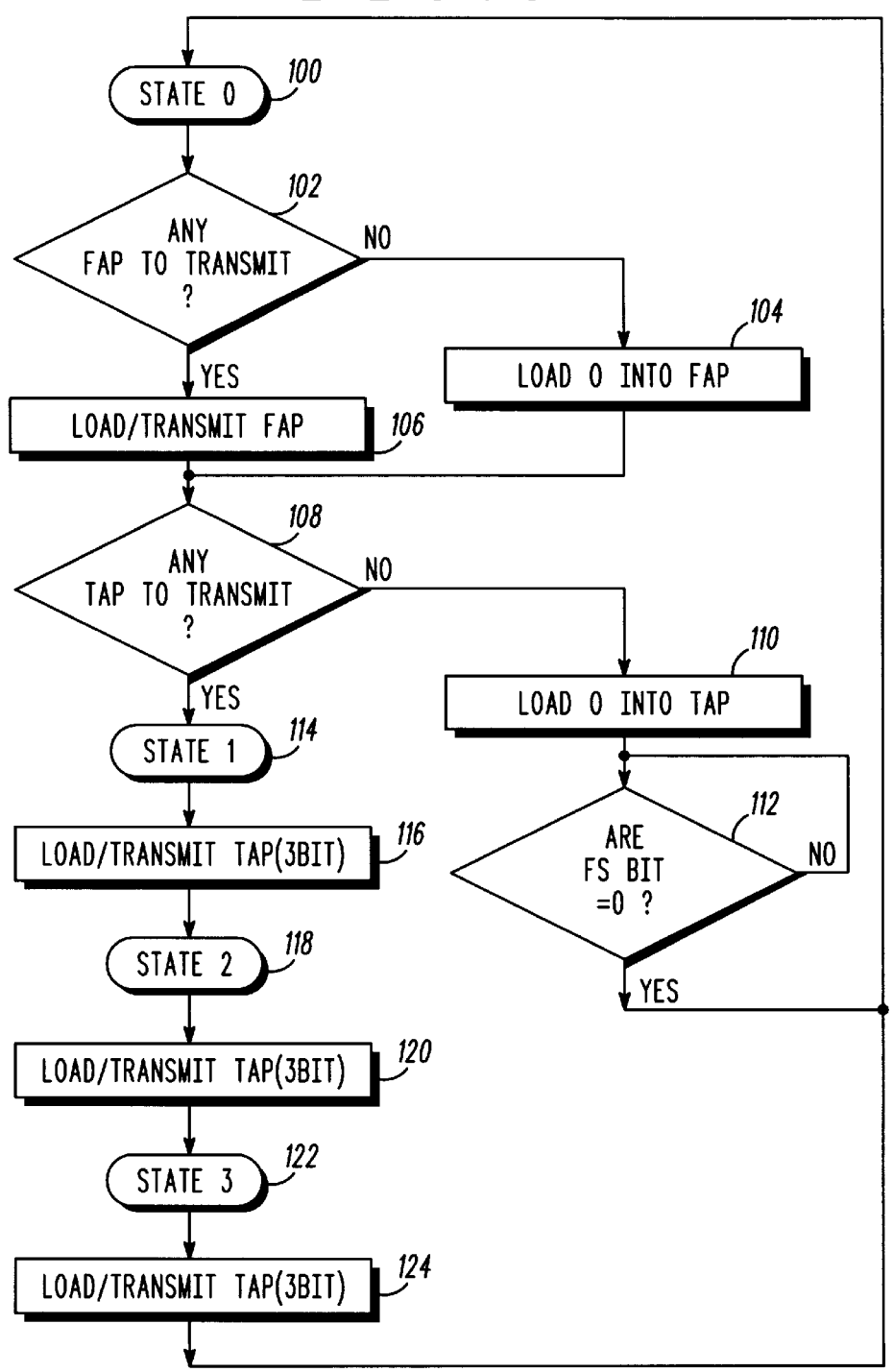
FIG. 4 is a flow chart of the process used in a base transceiver site to align a frame sequence.

FIG. 4 shows a flow diagram of the new frame and time alignment procedure as implemented by the BTS 14. The process starts at block 100, or state zero of the state machine. Next, the state machine determines if a frame alignment parameter (FAP) needs to be sent at block 102. When no frame alignment parameter needs to be transmitted at block 102, the state machine loads a zero into the frame alignment parameter at block 104. If the state machine determines at block 102 that a frame alignment parameter does need to be sent, then the frame alignment parameter is transmitted at block 106. This section assures that the three bit frame alignment parameter is transferred to the BSC during state 0 (i.e., frame sequence zero).

The next step determines if a time alignment parameter (TAP) needs to be transmitted, at block 108. If no time alignment parameter needs to be sent, then zero is loaded into the time alignment parameter at block 110. Processing then waits at block 112 until the frame sequence number (FS) is zero. Once the frame sequence number is equal to zero at block 112 processing returns to block 100.

When the time alignment parameter needs to be transmitted at block 108, the state machine waits until it is in state 1 (i.e., frame sequence number equal to 1) at block 114. Next, three of the eight bits of the time alignment parameter are transmitted to the BSC 12 at block 116. The state machine then waits until it is state 2, at block 118. Three more bits of the time alignment parameter are transmitted at block 120. The state machine then waits until it is state 3, at block 122. The final two bits of the time alignment parameter are transmit at block 124. Processing then returns to block 100 where the process starts over.

Figure 5:
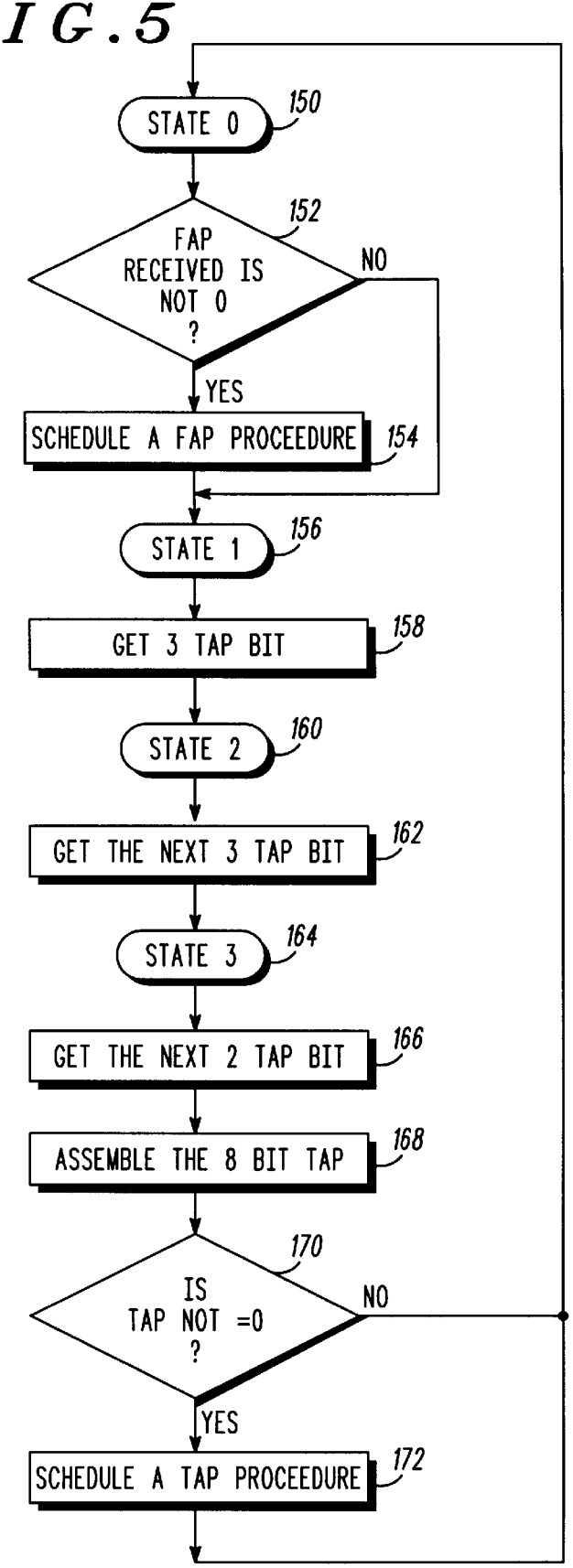
FIG. 5 is a flow chart of the process used in a base site controller to align the frame sequence.

The process the BSC 12 uses in receiving the frame and time alignment parameter is shown in FIG. 5. The process starts by the BSC controller 28 waiting until it is in state 0 (i.e., the frame sequence number equals 1), at block 150. Next the controller 28 determines if the frame alignment parameter is non-zero at block 152. When the frame alignment parameter is non-zero, a frame alignment procedure is scheduled at block 154. The controller then waits until it is in state 1, at block 156. At block 158, three bits of the time alignment parameters are received. The controller then waits until it is in state 2, at block 160. At block 162, three additional bits of the time alignment parameters are received. The controller then waits until it is in state 3, at block 164. At block 166, the final two bits of the frame alignment parameter are received. The eight bit time alignment parameter is assembled at block 168. At block 170, the controller determines if the time alignment parameter is non-zero. When the time alignment parameter is non-zero a time alignment procedure is scheduled at block 172. After a time alignment procedure is scheduled at block 172, processing then returns to block 150. The controller uses the frame alignment parameter to coordinate the frame sequence number inserted in the frame being sent from the transcoder 22 to the BTS with the GPS receiver. The controller uses the time alignment parameter to either advance or retard the beginning of the transmission of the frame. Frames are advanced by inserting a shortened synchronization word and retarded by delaying the transmission of the next frame. A normal length synchronization word is sixteen zeros followed by a one. A shortened synchronization word is twelve zeros followed by a one. Thus sending a shortened synchronization word advances the frame by four bits, which is equal to the four T bits that were dropped to advance a frame under the prior art.

Figure 6:
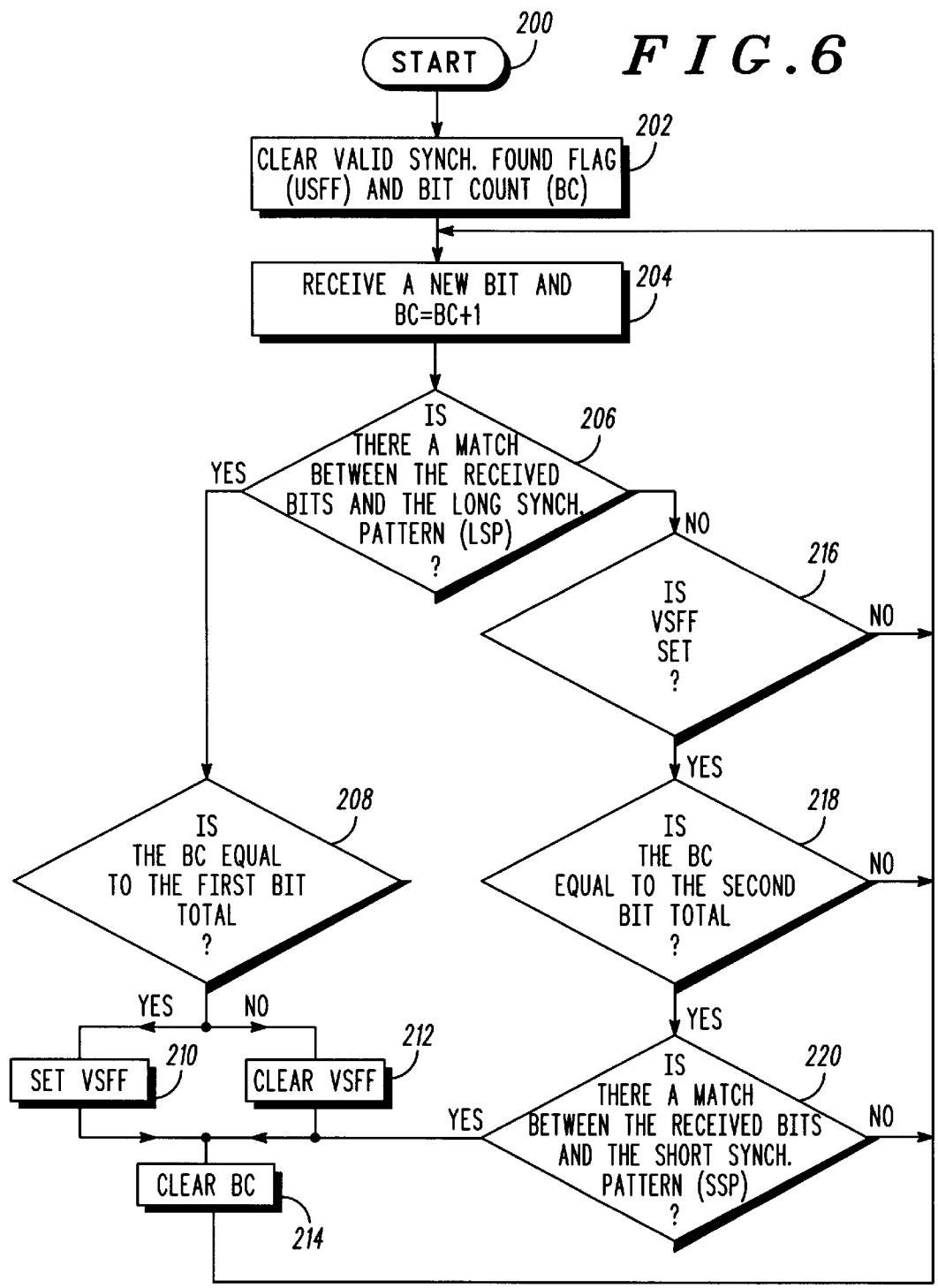
FIG. 6 is a flow chart of a process for detecting a dynamic synchronization word.

To implement a communication system with two different synchronization words requires a totally new synchronization process in the BTS 14. A process for acquiring synchronization at the BTS 14 is shown in FIG. 6. The process in FIG. 6 determines if the received bit pattern matches either the long or short synchronization word and the received number of bits is equal to the expected number of bits in a frame having a short or long synchronization pattern. The process starts at block 200. The valid synchronization word found flag (VSFF) and the bit count (BC) is cleared at block 202. A new bit is received and the bit count is incremented by one at block 204. Next it is determined if there is a match between the received bits and the long synchronization pattern (LSP) at block 206. When there is a match at block 206, the controller 40 then determines if the bit count is equal to a first bit total at block 208. The first bit total is equal to the bit total of a frame with a long synchronization pattern, 320 bits for the frame 60 of FIG. 3. When a match occurs at block 208 the valid synchronization flag is set at block 210. When a match does not occur at block 208 the valid synchronization word found flag is cleared, at block 212. The bit count is then cleared at block 214 and processing returns to block 204.

When a match does not occur at block 206, it is determined if the valid synchronization found flag is set at block 216. When the valid synchronization found flag is not set processing returns to block 204. When the valid synchronization found flag is set, the next step is to determine if the bit count is equal to a second bit total, at block 218. The second bit total is the number of bits in a frame having a shortened synchronization word, 316 in the case of frame 60 of FIG. 3. Processing returns to block 204, when the bit count is not equal to the second bit total. When the bit count is equal to the second bit total, the next step is to determine if there is a match between the received bits and the short synchronization pattern at block 220. Processing returns to block 204, when there is not a match between the received bits and the short synchronization pattern at block 220. The bit count is cleared at block 214, when there is a match between the short synchronization word and the received bits.

Using the process of FIG. 6 allows the BTS 14 to accurately detect when either a long or a short synchronization word has been sent by the transcoder 22 of the BSC 12. The variable length synchronization word allows the communication system 10 to time align the frames without using the T bits and therefore increasing the usable data rate.

Figure 7:
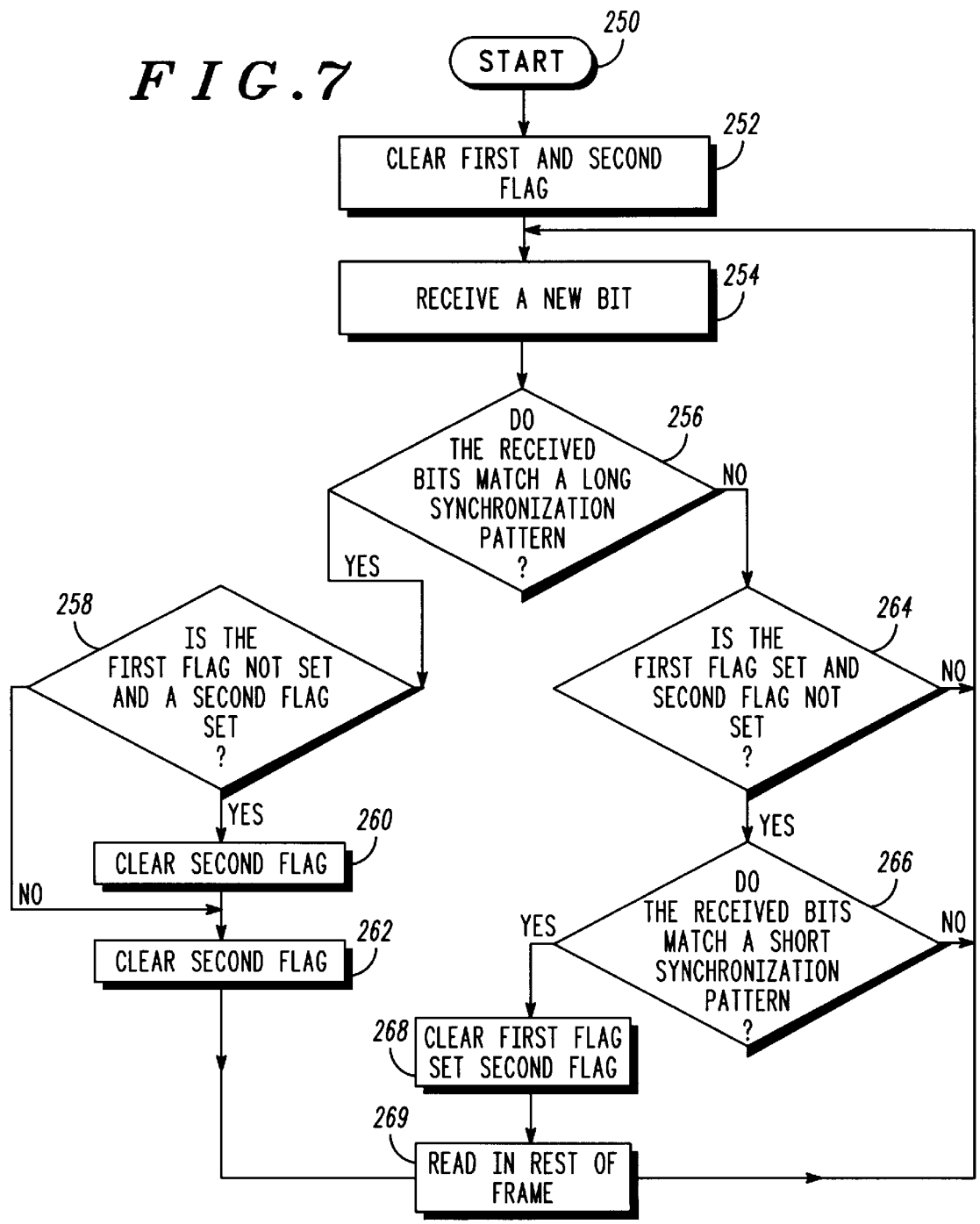
FIG. 7 is a flow chart of another process for detecting a dynamic synchronization word.

A second method for acquiring synchronization using two synchronization words is shown in FIG. 7. The process starts at block 250. A first and second flag are cleared at block 252. The first flag corresponds to the long synchronization word and the second flag corresponds to the short synchronization word. A new data bit (data stream) is received at block 254. At block 256 the BTS controller determines if the received bits (data stream) matches a long synchronization pattern. When the received data stream matches the long synchronization pattern at block 256, the controller determines if a first flag is not set and a second flag is set, at block 258. When the first flag is not set and the second flag is set at block 258, the second flag is cleared at block 260. If either the first flag is set or the second flag is not set, then processing continues at block 262. The first flag is set at block 262. At block 269 the rest of the frame is read in and processing returns to block 254.

When the received bits do not match the long synchronization pattern at block 256, the controller determines if the first flag is set and the second flag is not set, at block 264. Processing returns to block 254, when the first flag is not set or the second flag is set at block 264. When the first flag is set and the second flag is not set, the controller determines if the received bits match a short synchronization pattern at block 266. Processing returns to block 254, when the received bits do not match the short synchronization pattern at block 266. When the received bits do match the short synchronization pattern at block 266, then the first flag is cleared and the second flag is set at block 268. At block 268 the rest of the frame is read in and then processing then returns to block 254.

As can be seen by examining both synchronization detection methods of FIGS. 6 and 7, the short synchronization pattern cannot be sent first and the short synchronization pattern must be sandwiched between the long synchronization pattern. This does not present a concern since the time alignment parameter is only sent once every eight frames, see FIGS. 5 and 6. The first synchronization pattern must be the long synchronization pattern and the short synchronization pattern can only occur once every eight frames at the fastest.

There has been disclosed a unique system and method for time aligning a frame in a communication system. Using the invention frees up control bits, which increases the usable data rate in the communication system. This increased usable data rate allows the use of a 13.25 Kbps vocoder in a cellular communication system, having a 16 Kbps frame data rate. The higher rate vocoder increases the quality of the voice signals, in a cellular communication system using the invention described herein.

While the invention has been described in conjunction with specific embodiments thereof, it is evident that many alternatives, modifications, and variations will be apparent to those skilled in the art in light of the foregoing description. For instance, the invention could be used in a wireline communication system or a data network. Accordingly, it is intended the invention embrace all such alternatives, modifications, and variations as fall within the spirit and broad scope of the appended claims.

What is claimed is:

1. A method of time aligning a frame in a synchronous communications network, comprising the steps of:

a0) receiving a frame at a radio communication unit;

a) determining if a next frame needs to be advanced;

b0) sending a time alignment advance request to a controller; and b) sending the next frame with a shortened synchronization word.

2. The method of claim 1, wherein step (a) further comprises the steps of:

a1) waiting until a state machine is in state zero;

a2) determining if a frame alignment parameter needs to be transmitted;

a3) when the frame alignment parameter needs to be transmitted, loading and transmitting the frame alignment parameter, otherwise transmitting zero;

a4) determining if a time alignment parameter needs to be transmitted;

a5) when the time alignment parameter needs to be transmitted, waiting until the state machine's state has changed;

a6) loading and transmitting a predetermined number of bits of the time alignment parameter; and a7) repeating steps (a5) and (a6) until all the bits of the time alignment parameter have been transmitted.

3. The method of claim 1, wherein step (a) further includes the steps of:

a1) waiting until a state machine is in state zero;

a2) determining if a frame alignment parameter has been received;

a3) when a frame alignment parameter has been received scheduling a frame alignment procedure, otherwise proceeding to step (a4);

a4) waiting until the state machine's state has changed;

a5) receiving a predetermined number of bits of a time alignment parameter;

a6) repeating steps (a4) and (a5) until all bits of the time alignment parameter have been received;

a7) determining if the time alignment parameter is non-zero; and a8) when the time alignment parameter is non-zero scheduling a time alignment procedure.

4. A system for time aligning a frame in a synchronous communication system, comprising:

means for receiving a frame at a radio communication unit;

means for determining if a next frame needs to be advanced;

means for sending a time alignment advance request to a controller; and means for sending the next frame with a shortened synchronization pattern.

* * * * *